(12) United States Patent
Piagentini et al.

(10) Patent No.: US 12,554,529 B2
(45) Date of Patent: Feb. 17, 2026

(54) OPERATION EXECUTION FOR CONNECTION SERVICE INTEGRATION

(71) Applicant: Salesforce, Inc., San Francisco, CA (US)

(72) Inventors: Federico Piagentini, Buenos Aires (AR); Javier Dombronsky, Buenos Aires (AR); Leonardo Rodriguez, Buenos Aires (AR)

(73) Assignee: Salesforce, Inc., San Francisco, CA (US)

( * ) Notice: Subject to any disclaimer, the term of this patent is extended or adjusted under 35 U.S.C. 154(b) by 455 days.

(21) Appl. No.: 18/078,839

(22) Filed: Dec. 9, 2022

(65) Prior Publication Data
US 2024/0192984 A1      Jun. 13, 2024

(51) Int. Cl.
*G06F 9/48*      (2006.01)
*G06F 9/455*     (2018.01)
*G06F 9/50*      (2006.01)

(52) U.S. Cl.
CPC ........... *G06F 9/48* (2013.01); *G06F 9/455* (2013.01); *G06F 9/45558* (2013.01); *G06F 9/4806* (2013.01); *G06F 9/4843* (2013.01); *G06F 9/4881* (2013.01); *G06F 9/50* (2013.01); *G06F 9/5005* (2013.01); *G06F 9/5011* (2013.01); *G06F 9/5027* (2013.01); *G06F 9/5061* (2013.01); *G06F 9/5077* (2013.01)

(58) Field of Classification Search
CPC ........ G06F 9/455; G06F 9/45558; G06F 9/48; G06F 9/4806; G06F 9/4843; G06F 9/4881; G06F 9/50; G06F 9/5005; G06F 9/5011; G06F 9/5027; G06F 9/505; G06F 9/5055; G06F 9/5061; G06F 9/5077
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |

(Continued)

*Primary Examiner* — Charles M Swift
(74) *Attorney, Agent, or Firm* — Sterne, Kessler, Goldstein Fox P.L.L.C.

(57) ABSTRACT

Methods, systems, and storage media are described for enabling the execution of design operations associated with service integrations. In particular, some implementations are directed to executing design operations using operation-specific processors. Other implementations may be disclosed or claimed.

19 Claims, 11 Drawing Sheets

(56) References Cited

U.S. PATENT DOCUMENTS

| | | |
|---|---|---|
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,120,714 B1 * | 11/2018 | Cabrera ............... G06F 9/5005 |
| 10,628,228 B1 * | 4/2020 | Theunissen ............ G06F 9/505 |
| 10,684,888 B1 * | 6/2020 | Sethuramalingam ...................... G06F 11/203 |
| 11,416,318 B1 | 8/2022 | Kraan Brun et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |

(56) References Cited

U.S. PATENT DOCUMENTS

| | | |
|---|---|---|
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2018/0150325 A1* | 5/2018 | Kuo ............... G06F 9/4843 |
| 2019/0227794 A1* | 7/2019 | Mercille ............ G06F 8/36 |
| 2019/0227842 A1* | 7/2019 | Qiu ................ G06F 9/5061 |
| 2021/0014132 A1* | 1/2021 | Smith .............. H04L 41/16 |
| 2021/0027415 A1* | 1/2021 | Khalid ............. G06N 20/00 |
| 2021/0240600 A1* | 8/2021 | Larosa ........... G06F 11/3698 |
| 2023/0088202 A1* | 3/2023 | Myers ............... G06F 8/63 |
| | | 717/176 |

* cited by examiner

160

Receiving, from a computing device of a user, a request for a design operation associated with a connector, wherein the design operation is to: test connectivity, complete a list of system interaction options, determine a set of fields or types associated with a system interaction, or determine an output data sample
162

Identifying, based on the request for the design operation, an operation-specific processor to process the design operation
164

Executing the design operation using the operation-specific processor based on the request
166

Sending a response to the computing device of the user that includes an indication of a result of executing the design operation
168

OPERATION EXECUTION FOR CONNECTION SERVICE INTEGRATION

TECHNICAL FIELD

Some implementations disclosed herein are directed to execution of design operations associated with service integrations. In particular, some implementations are directed to executing design operations using operation-specific processors.

BACKGROUND

In some systems for service integration, including database services, calendar applications, and software-as-a-service (SaaS), design operations are executed to trigger various tasks. Such tasks may include examples such as: "test connectivity of a connection", "autocomplete a drop-down of available record types" or "show the available fields for an opportunity." Additionally, "connectors" are pieces of software that enable connections to external systems and provide code for specific design operations.

In some systems, execution of a design operation associated with a connector requires an integration tool runtime to execute, which can be an expensive solution because it requires dedication of web servers and associated resources to execute, as well as a standalone context. Implementations of the present disclosure address these and other issues.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 1H is a flow diagram illustrating an example of a process for executing a design operation in accordance with various implementations.

DETAILED DESCRIPTION

Figure 1A:
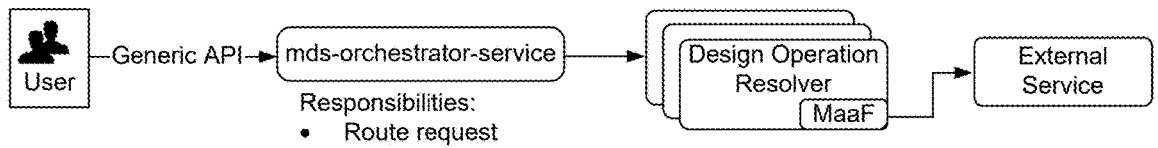
FIG. 1A is a functional block diagram illustrating an example of an implementation for design operation execution in accordance with various implementations.

As introduced above, the execution of a design operation associated with a connector generally requires an integration tool runtime to execute. This is a resource-costly solution as it requires dedication of web servers and associated resources to execute, as well as a standalone context. Implementations of the present disclosure address these and other issues by routing requests for design operations associated with a connector to a design operation resolver that selects an operation-specific processor to execute the design operation. The operation-specific processor can be generated on demand to handle a design operations of a particular connector. The generated operation-specific connector can then be cached so that it can be re-used for the same connector in the future, thereby saving resources.

Implementations of the present disclosure provide a number of advantages over conventional systems. For example, some implementations help avoid having a hard dependency on a web server dedicated to processing the design operations, which is significant since web servers are often business-specific, which forces application programming interface (API) users to know (and be bound to) a particular domain. Web servers are also typically single-tenant because of security concerns, which means there need to be special features (such as stickiness and added controls) which limit scalability. Additionally, the cost of operation associated with web servers is often very high, since each web server requires significant CPU resources (which can't be easily improved upon), the single-tenancy of web servers requires more instances to support the same amount of customers compared to a multi-tenant solution, and to provide suitable responsiveness web servers need to be running before a customer arrives, which means operators must pay for resources they are not actively using. In some cases, utilizing implementations of the present disclosure may provide up to a 90% reduction in the costs associated with design operation execution relative to conventional systems, as well as up to a 60% reduction in user interface (UI) response time.

Implementations of the present disclosure, by contrast, can provide a domain-agnostic serverless API which can help solve many design operations without the need for a running web server by executing a set of libraries in multi-tenant service instances. As described in more detail below, some implementations provide a unified API that is not bound to a runtime domain, where each server instance generally requires less CPU/memory than any single runtime web server from conventional solutions. Additionally, all pre-existing connectors are compatible with the implementations of the present disclosure, and creation of non-domain specific connectors may be utilized as well.

Implementations of the present disclosure can achieve multi-tenancy through: (1) file system isolation where each design operation is executed in a controlled way preventing the file system from being altered; (2) memory isolation where each design operation executes in a controlled new process with its own memory allocation; and/or (3) network policies controlling the egress traffic to prevent each design operation from hitting (or aiming to hit) any internal components, yet still enabling the design operation to interact with the Internet and the required external services.

As used herein, the term "connector" refers to a piece of software that is operable to connect to an external system. For example, a Salesforce connector is configured to authenticate and make requests to the Salesforce API. Connectors also influence how a design operation works.

Design operations, as introduced above, are actions that help users (e.g., customers) build integrations by executing code from a connector. Some examples of design operations include: (1) testing connectivity: validating if a set of credentials enable connecting to a system; (2) value resolver: autocompleting a drop-down of options that may be useful for interacting with the system (e.g., a list of channels from a messaging/collaboration application such as "Slack"); (3) metadata resolution: getting a description of fields and types that a given system accepts or returns in an interaction (e.g., a Salesforce opportunity domain object description with fields such as name and creation date); and (4) sample data: getting an example of what an action/operation will return (e.g. Slack showing a sample user data next to an operation called "Get User Data" to give an idea of a sample result).

Some implementations of the present disclosure are described herein with reference to the "product composer" from Mulesoft, which may also be referred to as "Mule." Implementations of the present disclosure may operate in conjunction with Mule, as well as other integration tools that help provide connections to different services. Some references are also made to Mule as a framework (MaaF), which is an application programming interface (API) that exposes design operations of a connector to a client application. In this manner, MaaF provides a framework allowing a connector to be used by a client application without the need for a deployed integration tool process, thereby saving resources relative to conventional systems.

In some implementations, MaaF may be implemented as a library or set of libraries (e.g., written in Java or another suitable language) enabling the system to avoid starting a Mule runtime that depends on the Mule runtime model, but includes a layer of abstraction on top. References to Mule, MaaF, or any other particular software application herein are simply for purposes of illustration, and implementations of the present disclosure may be implemented in conjunction with other suitable service integration tools or other software applications.

FIG. 1A is a functional block diagram illustrating an example of an implementation for design operation execution in accordance with various implementations. In this example, an mds-orchestrator-service receives a request for a design operation from a user through a generic API, and routes the request to a design operation resolver, which internally uses a set of libraries (MaaF in this example) to solve for design operations against the external service. An external service defines an external provider of services which are usually offered through a Public API (e.g., Salesforce, Slack, Google, etc.). For the end-user of the API, each request is a request/response synchronous interaction where the implementation is completely abstracted.

This disclosure proceeds by describing some examples of implementations that may utilize existing toolings, which may require the solving of design operations in a single-tenancy manner. Among other things, implementations of the present disclosure help ensure that users/customers can execute design operations in an isolated environment, which can be achieved, for example, using docker images and Kubernetes virtualization.

Figure 1B:
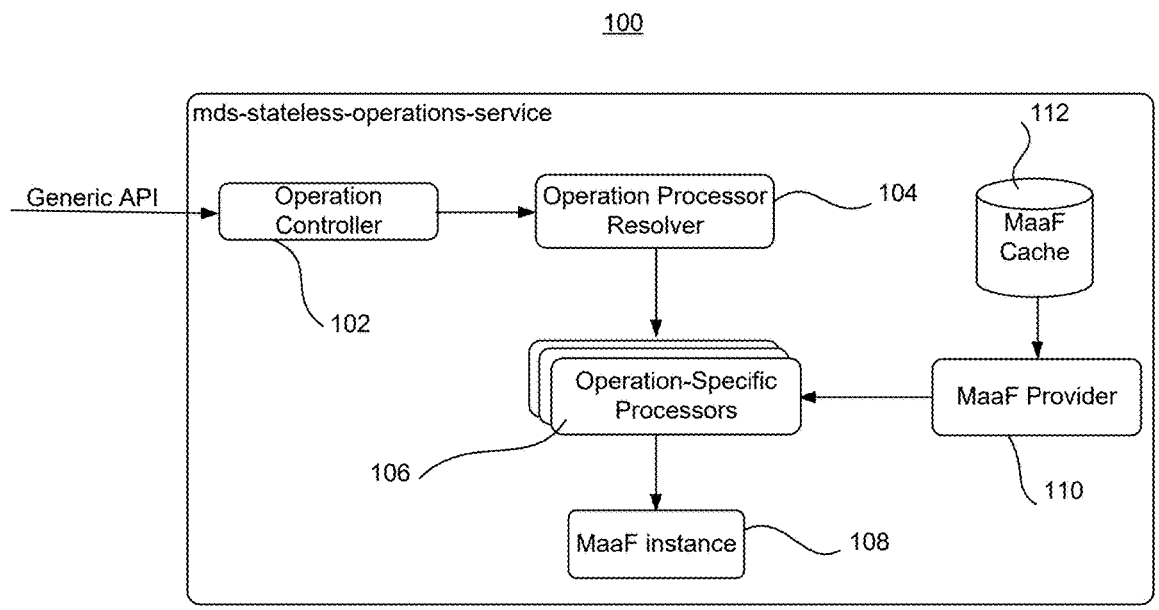
FIG. 1B is a functional block diagram showing an example of a stateless operations service 100 in accordance with various implementations.

FIG. 1B is a functional block diagram showing an example of a stateless operations service 100 in accordance with various implementations. The stateless operations service 100 may be used to handle multiple instances of a framework library (MaaF in this example) to solve/execute design operations. In this example, the stateless operations service 100 includes: an operation controller 102, an operation processor resolver 104, operation-specific processors 106, a framework library (MaaF) instance 108, an instance (MaaF) provider 110, and an instance (MaaF) cache 112. Alternate implementations may have more or fewer components to implement the functionality of the stateless operations service 100.

Figure 1C:
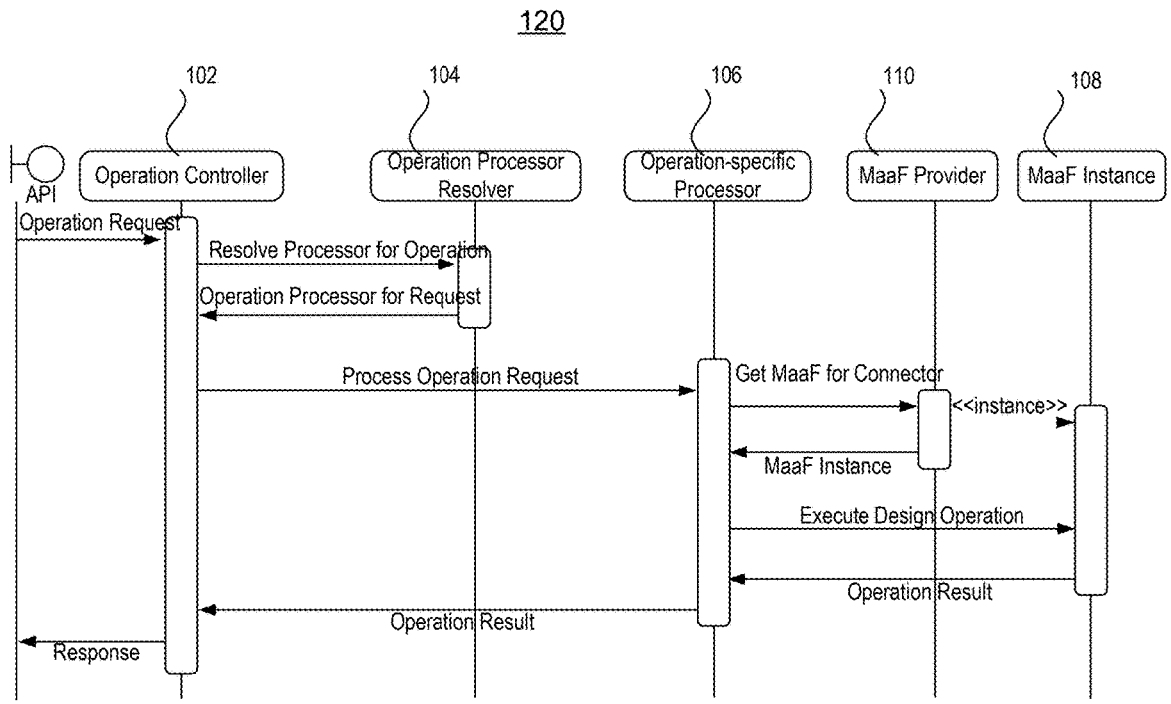
FIG. 1C is a process diagram showing an example of a process 120 to handle a request for a design operation by the components of the stateless operations service 100 shown in FIG. 1B.

FIG. 1C is a process diagram showing an example of a process 120 to handle a request for a design operation by the components of the stateless operations service 100 shown in FIG. 1B. In this example, the operation controller 102 is the entry point to the service 100. The operation controller 102 declares all the endpoints supported by the service 100 and contains the model definition for all the requests that are required to execute/solve the design operations. In some implementations the request for the design operation includes one or more input parameters to use in executing the design operation. For example, for a "test connectivity" design operation, the request will have a section to identify which connector to test and another section with the credentials (and the fields where they need to be injected) in order to execute the design operation.

The operation processor resolver 104 is the first service layer after the operation controller 102, and may be used to find an operation-specific processor 106 based on the request and the connector so the design operation can be solved. In some implementations, there is a one-to-one mapping between the number of operation-specific processors 106 and connectors. The design operation request is parsed by the operation processor resolver 104 to identify the input parameters that are sent to each processor 106 that needs to be called in order to execute the design operation.

In some implementations, an "instance" (also referred to as a "worker") may be called to each pod where a service has started. For example the system may define that every service will have multiple instances, but some services that are required to be single-tenant in certain scenarios require an explicit handling of such instances. In some implementations, instances will stand behind a generic load balancer which enables horizontal scalability.

As used herein, the term "multi-tenant" refers to being able to support multiple clients/organizations in the same instance. Conversely, the term "single-tenant" refers to only handling traffic from a single client/organization. One difference between single-tenant and multi-tenant relies on the trust zone and usage of resources inside a service instance. If there is no chance for side-effect of one client operating, then that service (usually) can be multi-tenant.

As noted previously, implementations of the present disclosure can avoid generating (MaaF) instances 108 from scratch every time, which is very CPU and Networking intensive. Instead, the system can generate a pool of prepared instances 108 bound to the operation-specific processors 106, which handle the lifecycle of the instance 108. In some implementations, the first time a new connector is to be used in the service a new instance 108 will be generated, a new processor 106 will be created to own the lifecycle, and the instance 108 will be cached in the (MaaF) instance cache 112 so the next time that connector needs to be solved, the system saves time and resources by not having to generate the instance.

In some implementations, the (MaaF) instance 108 represents a Java instance based on the connector descriptor, which is a GAV (GroupId, ArtifactId and VersionId) associated with the "Maven" build automation tool from Apache. The instance provider 110 receives as parameter the GAV of a connector and produces a connector-specific instance based thereon. In some implementations, as part of the construction of the instance 108, the connector's dependencies are downloaded and stored in a local (Maven) repository. The software instance 108 may be generated based on such dependency information for the connector.

Figure 1D:
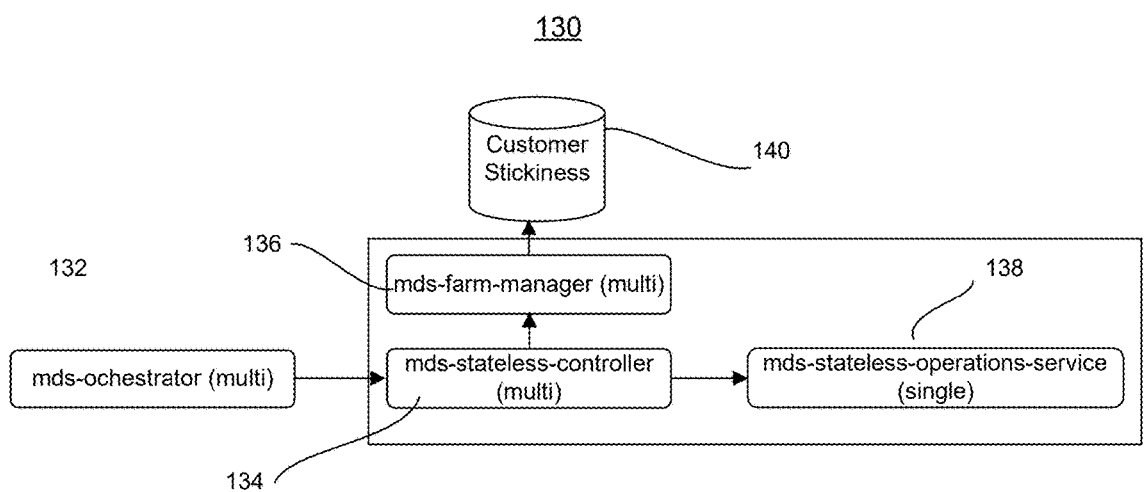
FIG. 1D is a functional block diagram showing an example of an architecture 130 providing multi-tenancy and single tenancy in handling design operation requests in accordance with various implementations.

FIG. 1D is a functional block diagram showing an example of an architecture 130 providing multi-tenancy and single tenancy in handling design operation requests in accordance with various implementations. In this example, the orchestrator 132, stateless controller 134, and farm manager 136 services are labeled "multi" as handling traffic from multiple customers. Conversely, the stateless operations service 138 is labeled "single" as handling only a single customer at a given time. Among other things, this architecture helps ensure security while executing any code beyond the control of the system from a connector.

In some implementations, all services are stateless by default, which means synchronous HTTP requests coming from a client would be handled by any instance of any service in the architecture being distributed by a generic load balancer. In some use-cases, the system may use information from the customer stickiness database 140 to force requests from the same origin to be routed to the same service instance.

Figure 1E:
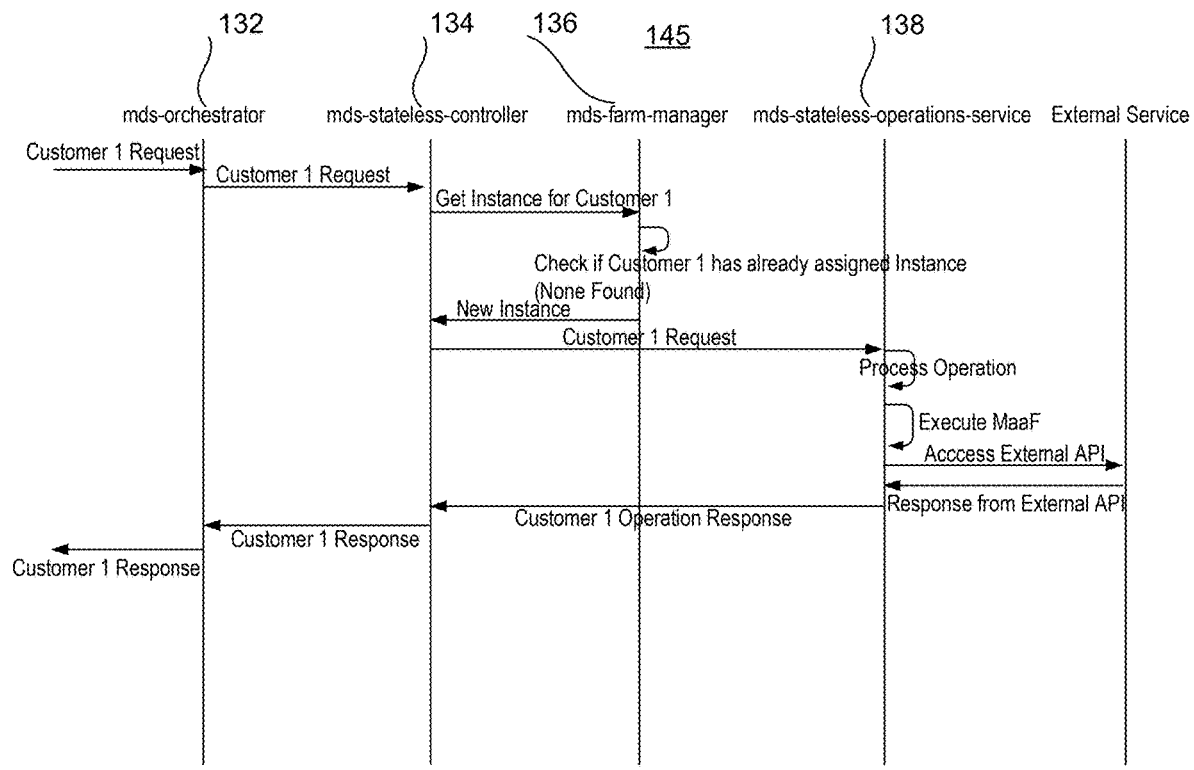
FIG. 1E, FIG. 1F, and FIG. 1G are process diagrams illustrating examples of different use cases for handling design operation requests using the architecture 130 in FIG. 1D.
Figure 1F:
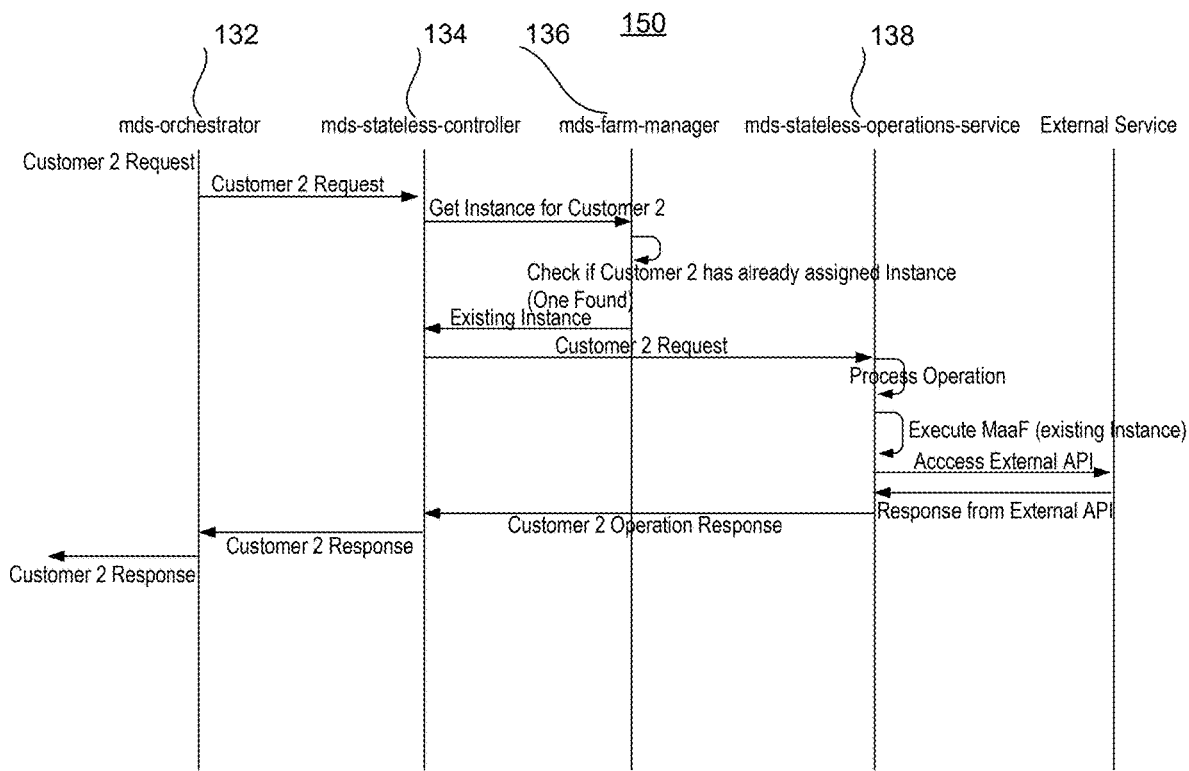
Figure 1G:
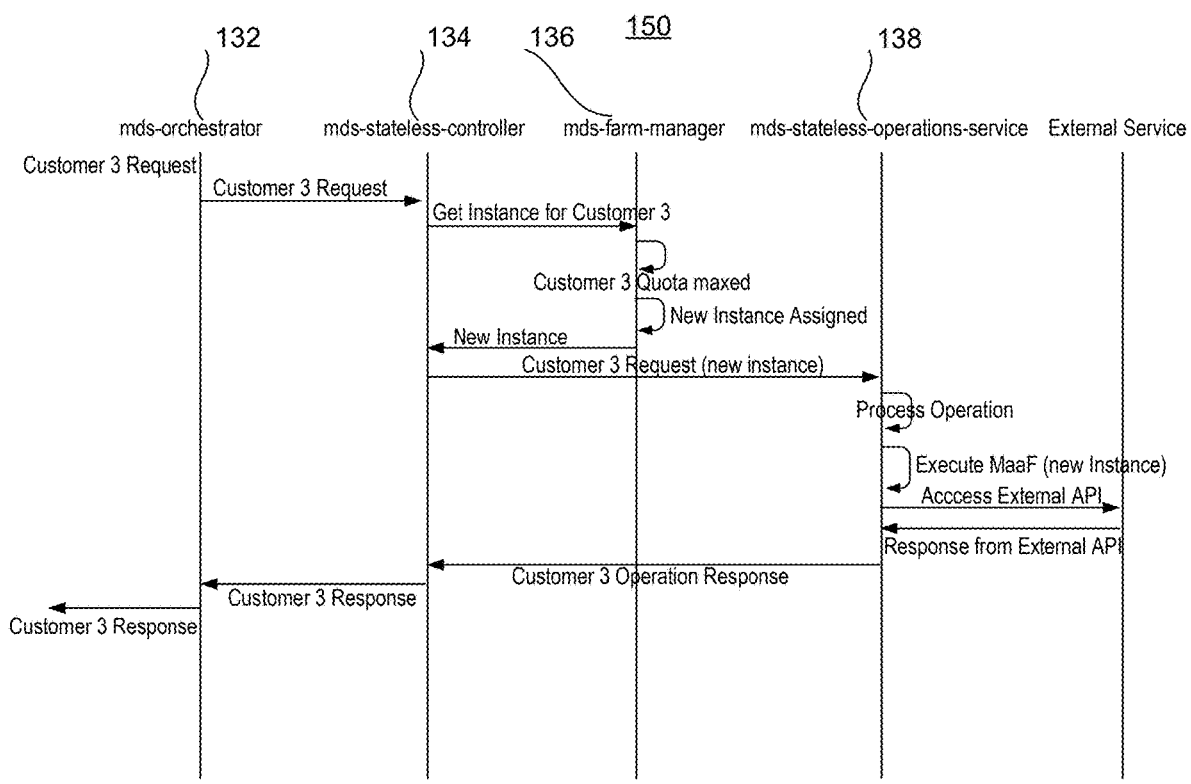

FIG. 1E, FIG. 1F, and FIG. 1G are process diagrams illustrating examples of different use cases for handling design operation requests using the architecture 130 in FIG. 1D. For example, FIG. 1E illustrates an example of process 145 where a design operation request (Customer 1 Request) is received by the orchestrator 132 and the customer has no stateless operations service 138 instance previously assigned. In this example, the customer is assigned a new instance and stickiness information associated with the instance stored by the farm manager 136 in the customer stickiness database 140.

In another example, FIG. 1F illustrates a process 150 for a use case where a design operation request (Customer 2 Request) is received by the orchestrator 132 and the customer already has an instance assigned. In this case, the farm manager 136 finds the previous instance and returns it to the stateless controller 134 for executing the design operation by the stateless operations service 138. In this manner, the system can make effective use of available resources by not having to generate the instance from scratch.

FIG. 1G illustrates an example of a process 150 for another use case where a design operation request (Customer 3 request) is received by the orchestrator 132 and the customer already has a stateless operations service instance 138 assigned. In this case, the farm manager 136 determines that the customer has reached a quota of maximum concurrent operations and therefore needs to have a separate instance assigned. The farm manager 136 generates a new instance and returns it to the stateless controller 134, and the stateless operation service 138 uses the new instance to execute the design operation identifies in the customer's design operation request. As a result, the customer has two instances available for usage.

FIG. 1H is a flow diagram illustrating an example of a process for software service integration in accordance with various implementations. In some implementations, process 160 may be performed by a stateless operations service, such as the stateless operations service 100 in FIG. 1B. In this example, process 160 includes, at 162, receiving, from a computing device of a user, a request for a design operation associated with a connector (e.g., operable to interface with a software service), wherein the design operation is to: test connectivity, complete a list of system interaction options, determine a set of fields or types associated with a system interaction, or determine an output data sample. The process further includes, at 164, identifying, based on the request for the design operation, an operation-specific processor to process the design operation. In some implementations, the operation-specific processor comprises a software instance that is generated based on: a group identifier, an artifact identifier, and a version identifier. The process further includes, at 166, executing the design operation using the operation-specific processor based on the request. The process further includes, at 168, sending a response to the computing device of the user that includes an indication of a result of executing the design operation.

Similar to the example shown in FIG. 1F, process 160 may further include receiving, from a computing device of the user, a second request for the design operation associated with the connector. The system (e.g., the farm manager 136) identifies, based on the second request for the design operation, the operation-specific processor that executed the design operation in response to the first request, executes the design operation based on the second request, and sends a response to the computing device of the user that includes an indication of a result of executing the design operation based on the second request. Furthermore, executing the design operation based on the second request may include retrieving the operation-specific processor from a cache (e.g., cache 112) subsequent to execution of the design operation based on the first request, and executing the design operation using the retrieved operation-specific processor. In this manner, instances previously generated to execute design operations can be re-used.

Similar to the example in FIG. 1G, consider the operation-specific processor as a first operation-specific processor, and executing the design operation based on a second request from the user includes: determining that the user associated with the first operation-specific processor has reached a maximum number of concurrent operations, and generating a second operation-specific processor with which to execute the design operation based on the second request.

Figure 2:
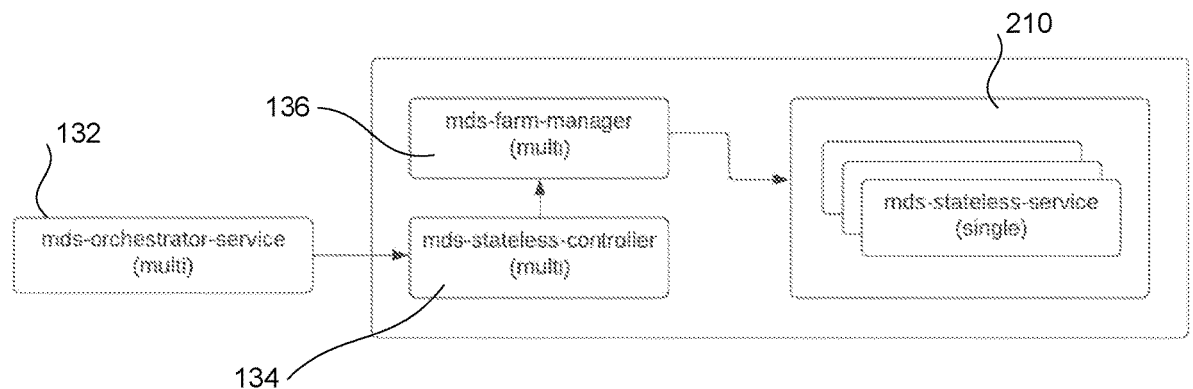
FIG. 2 is a functional block diagram illustrating an example of an architecture for scaling the number of available pods for resolving design operation requests in accordance with various implementations.

FIG. 2 is a functional block diagram illustrating an example of an architecture for scaling the number of available pods for resolving design operation requests in accordance with various implementations. In this example, architecture 200 comprises an orchestrator service 132, stateless controller 134, and farm manager 136 as described above with reference to FIG. 1D. In this example, the farm manager 136 accesses a pool of stateless services 210, which are ready to process incoming operations. The system may determine that a corresponding pool of available pods (e.g., groups of computing resources) to execute the design operations is below a predetermined threshold, and in response to this determination add a predetermined number of pods to the pool to ensure that there are always pods available to resolve operations. Conversely, as incoming design operation requests decrease to the point that pods in the pool are becoming idle, the farm manager 136 may reduce the number of available pods in the pool in order to save resources and reduce costs.

Figure 3:
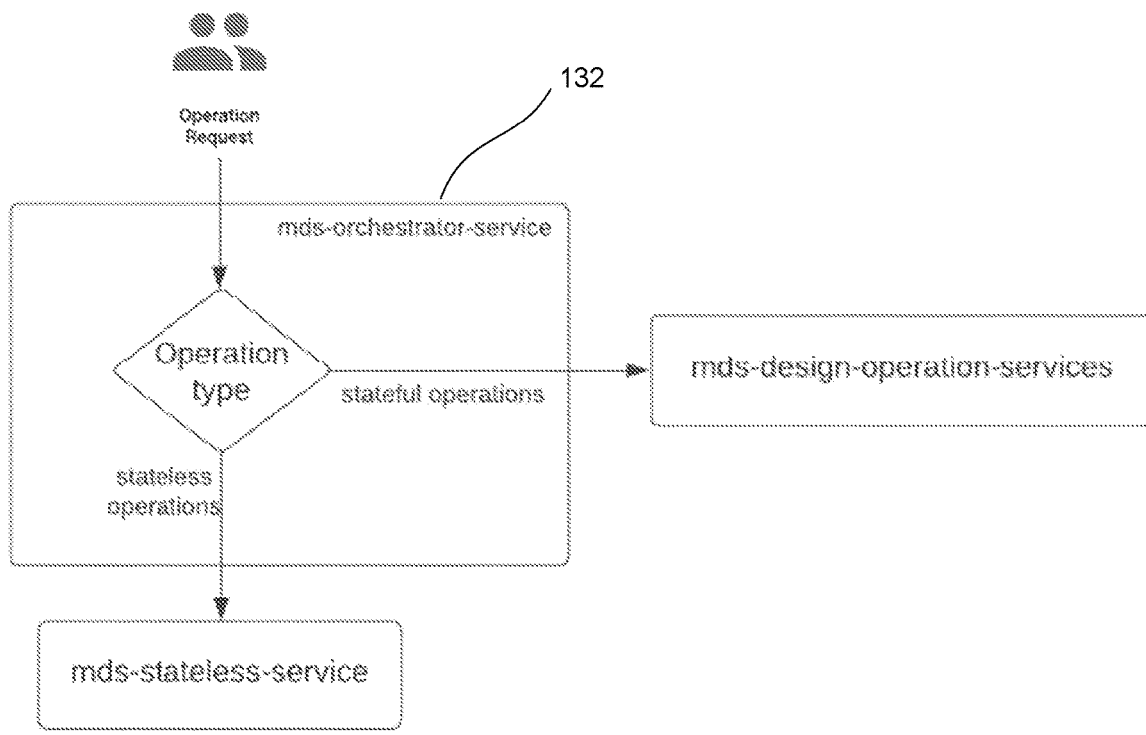
FIG. 3 is a functional block diagram illustrating an example of an architecture wherein an orchestrator service receives design operation requests in accordance with various implementations.

FIG. 3 is a functional block diagram illustrating an example of an architecture wherein an orchestrator service receives design operation requests in accordance with various implementations. In this example, the orchestrator service 132 provides an abstraction over the offering of stateless design operations. In this example, the orchestrator service 310 routes stateful operations to the design operations services component, and stateless operations to the stateless service. In particular, for stateless operations the orchestrator 132 considers synchronous request/response that are supported by an (MaaF) instance. For stateful operations, the orchestrator 132 considers multi-request operations which may still require a (Mule) runtime, such as operations that must actually execute a flow/integration to test fully.

Figure 4A:
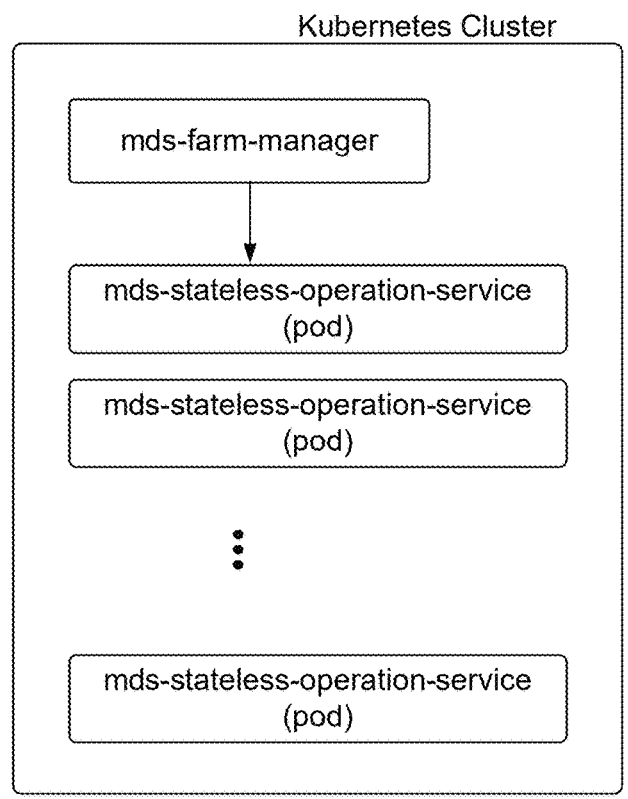
FIG. 4A is a block diagram illustrating a deployment of a stateless operations service in accordance with various implementations.

FIG. 4A is a block diagram illustrating a deployment of a stateless operations service in accordance with various implementations. In this example, the deployment comprises a Kubernetese cluster (a set of nodes that run containerized applications) 400 that includes the farm manager and a plurality of stateless operation services each assigned to a respective pod. Based on the Kubernetes cluster 400, the system builds a deployment of the mds-stateless-operation-service, which is single-tenant. The mds-farm-manager uses a Kubernetes API to monitor this deployment and handle the life-cycle of each instance/worker.

Figure 4B:
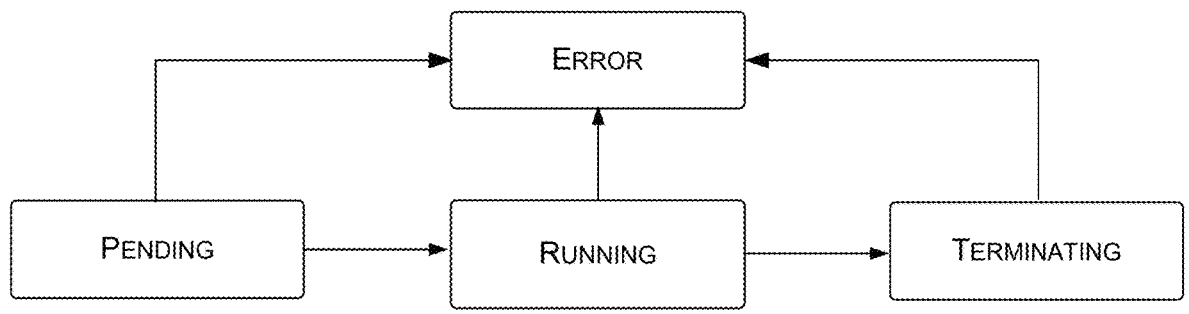
FIG. 4B is a block diagram illustrating an example of an instance life cycle in accordance with various implementations.
Figure 4C:
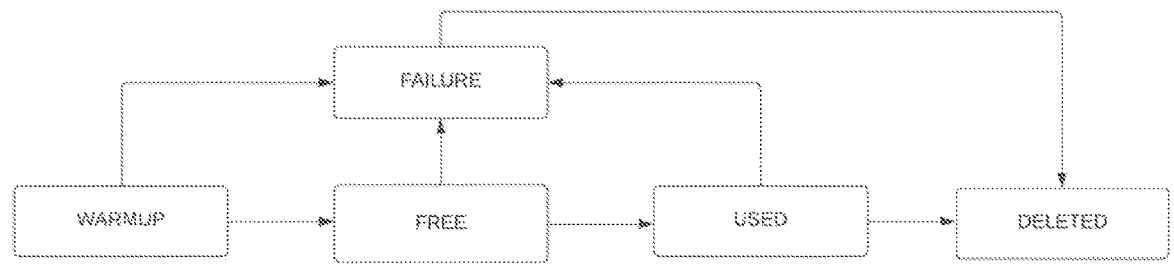
FIG. 4C is a block diagram illustrating examples of states within a farm manager service in accordance with various implementations.

FIG. 4B is a block diagram illustrating an example of an instance life cycle in accordance with various implementations. FIG. 4C is a block diagram illustrating examples of states within a farm manager service in accordance with various implementations. In these examples, life cycle 410 may be associated with the Kubernetes cluster shown in FIG. 4A. In some implementations, the system may process the life cycle 410 as follows:

Pending: The system ignores this state.
Running: In response to detecting an instance in a Running state, the system will set it in a WARMUP queue to prepare to be accessed by customers.
Running (2): Once an instance has finished the WARMUP steps (described below) then the system will set the instance as FREE so it can be assigned to customers.
Running (3): Once the instance is assigned to a customer, the system may set the state to USED.
Running (4): In response detecting an instance has not been USED for at least a predetermined period of time, the system will trigger the recycling process by DELETING it, this will move the pod to a Terminating state.
Terminating: Triggered when a USED instance has finished doing any tasks and have been idle for a predetermined period of time (e.g. 30 seconds). This enables constant recycling of instances to maintain high availability.

Among other things, the warmup process described above enables the customer to skip the required startup time when executing any Design Operation. The warmup process may include a file system warmup as well as a memory/class-loading warmup. The file system warmup may include downloading all required dependencies and doing all input/output (IO) which needs to be done one-time-only. The memory/classloading warmup helps to prevent any first-time efforts on the common libraries used (like MaaF).

Figure 5:
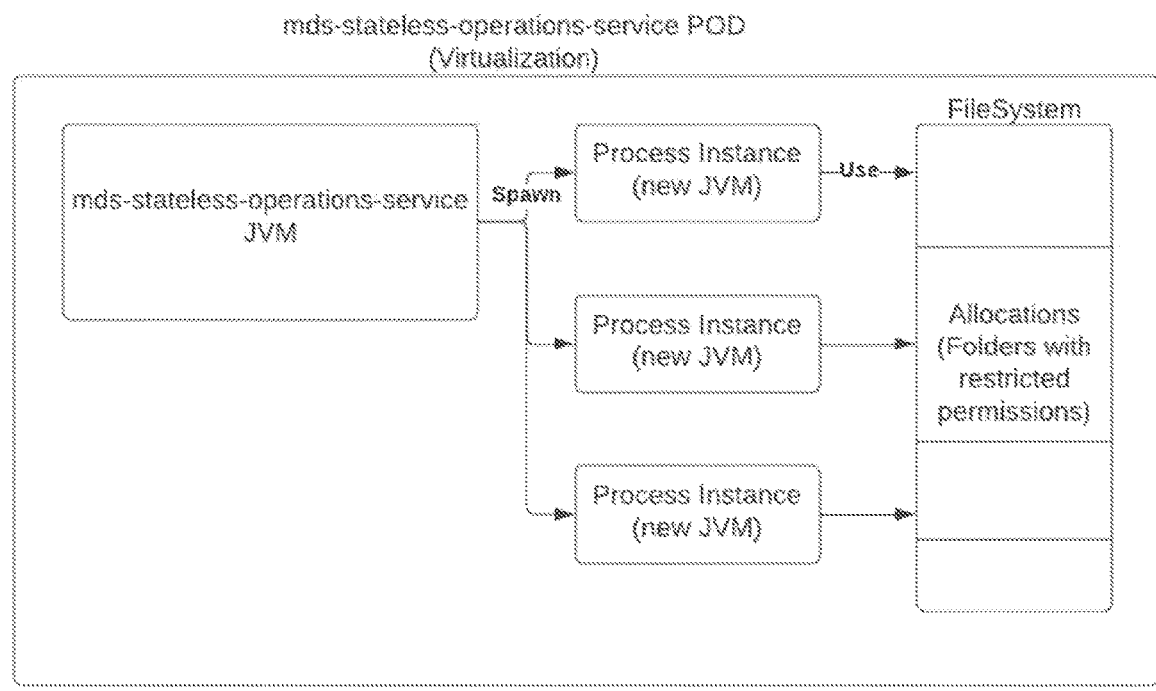
FIG. 5 is a functional block diagram illustrating an example of memory and file system isolation by a stateless operations service in accordance with various implementations.

FIG. 5 is a functional block diagram illustrating an example of memory and file system isolation by a stateless operations service in accordance with various implementations. In this example, memory isolation is achieved by spawning new, separate processes from a main process. Among other things, this enables each mds-stateless-operations-service to be fully multi-tenant while only the process instance executing a single (MaaF) instance and a single design operation needs to be single tenant. With respect to file system (disk) isolation, as the stateless operations service spawns each new process, it assigns a piece of the file system in the form of a folder with specific permissions so that only new processes can read/write. Once the process is completed the memory is released and the file system/disk is freed.

Figure 6A:
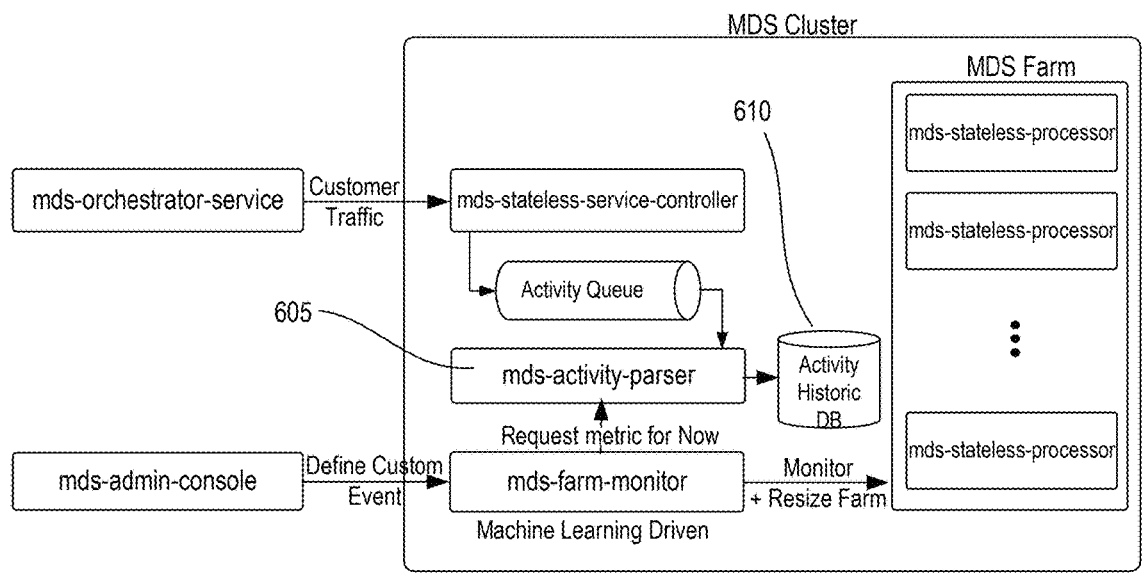
FIG. 6A is a functional block diagram illustrating an example of an architecture for implementing machine learning (ML) in accordance with various implementations.

FIG. 6A is a functional block diagram illustrating an example of an architecture for implementing machine learning (ML) in accordance with various implementations. In this example, architecture 600 includes an activity parser 605 that tracks data associated with the usage of stateless instances in a database of historic activity 610. The system may run the data through an ML model to predict the required number of instances and then scale the number of instances up or down predictively to help reduce the cost of operation.

Figure 6B:
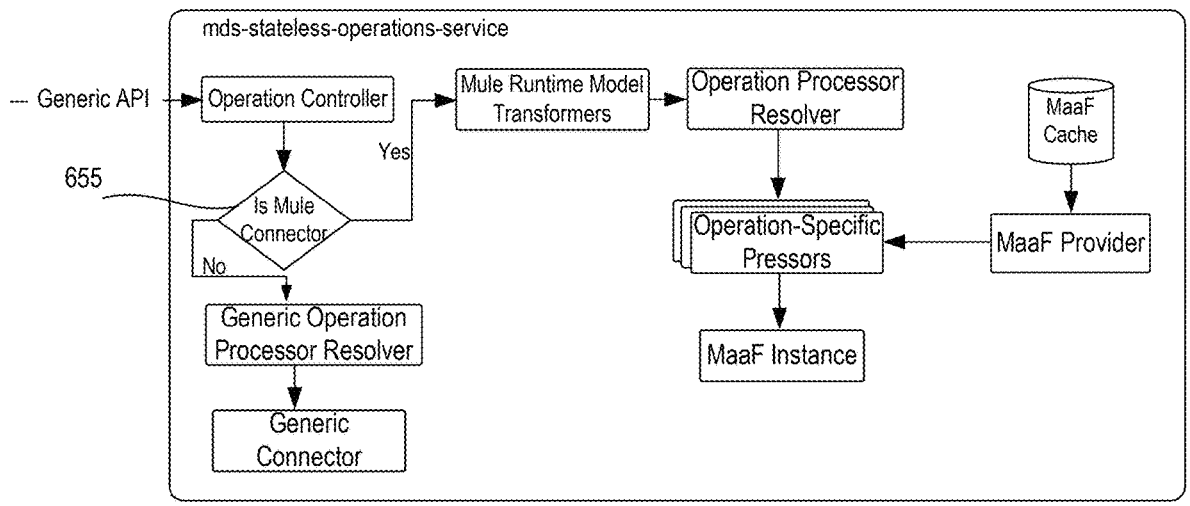
FIG. 6B is a functional block diagram illustrating an example of executing connector functionality without a runtime domain in accordance with various implementations.

FIG. 6B is a functional block diagram illustrating an example of executing connector functionality without a runtime domain in accordance with various implementations. In this example, the system (the operation controller in this example) may determine, at 655 if it is working with a particular runtime (e.g., Mule) solution or with any other connector that solves for the stateless processor model. If so, the system may forego use of an (MaaF) instance and instead perform a direct mapping from the request model into a call into the connector, which can be done directly against the code of the connector. The connector code could be written in a variety of programming languages since it executes in a separate process. This solution is not defined by a particular runtime, which provides all the pieces to define what each design operation is and how to solve it by executing a piece of code and sending parameters. Instead, this new model may use as baseline the fact that connectors are executed in separate processes, allowing the sharing of parameters as bash level input parameters, which enables executing a set of supported languages based on any available technology. For example, the system may install a C #executor, run Python, or install a Rust compiler to execute, among other examples.

As illustrated in the description above, implementations of the present disclosure can provide a cloud-based solution that allows the execution of connectors without a runtime, as well as the ability to integrate with external services without having to know an underlying runtime domain (e.g., executing a "test connectivity" design operation by just providing the credentials and the name of the connector, no runtime specifics required). Implementations of the present disclosure further provide for multi-tenant flow integration operations execution.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Electronic Devices and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, work-stations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 7A:
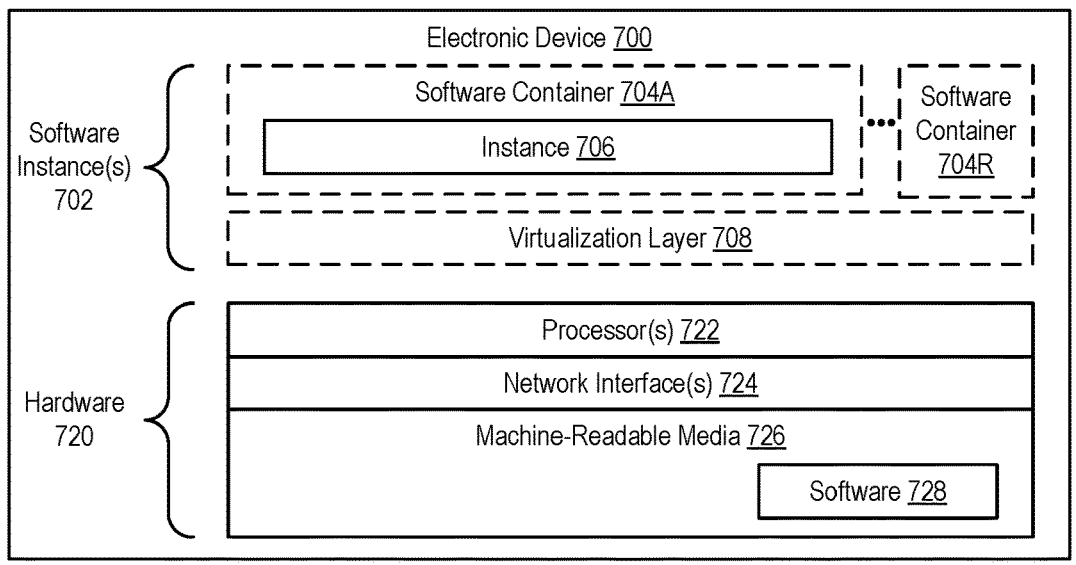
FIG. 7A is a block diagram illustrating an electronic device in accordance with various implementations.

FIG. 7A is a block diagram illustrating an electronic device 700 according to some example implementations. FIG. 7A includes hardware 720 comprising a set of one or more processor(s) 722, a set of one or more network interfaces 724 (wireless and/or wired), and machine-readable media 726 having stored therein software 728 (which includes instructions executable by the set of one or more processor(s) 722). The machine-readable media 726 may include non-transitory and/or transitory machine-readable media. Each of the previously described clients and the network protocol for extending a trust boundary between cloud domains of the same entity may be implemented in one or more electronic devices 700. In one implementation: 1) each of the clients is implemented in a separate one of the electronic devices 700 (e.g., in end user devices where the software 728 represents the software to implement clients to interface directly and/or indirectly with the network protocol for extending a trust boundary between cloud domains of the same entity (e.g., software 728 represents a web browser, a native client, a portal, a command-line interface, and/or an application programming interface (API) based upon protocols such as Simple Object Access Protocol (SOAP), Representational State Transfer (REST), etc.)); 2) the network protocol for extending a trust boundary between cloud domains of the same entity is implemented in a separate set of one or more of the electronic devices 700 (e.g., a set of one or more server devices where the software 728 represents the software to implement the network protocol for extending a trust boundary between cloud domains of the same entity); and 3) in operation, the electronic devices implementing the clients and the network protocol for extending a trust boundary between cloud domains of the same entity would be communicatively coupled (e.g., by a network) and would establish between them (or through one or more other layers and/or or other services) connections for submitting configuration data to the network protocol for extending a trust boundary between cloud domains of the same entity and returning a software package to the clients. Other configurations of electronic devices may be used in other implementations (e.g., an implementation in which the client and the network protocol for extending a trust boundary between cloud domains of the same entity are implemented on a single one of electronic device 700).

During operation, an instance of the software 728 (illustrated as instance 706 and referred to as a software instance; and in the more specific case of an application, as an application instance) is executed. In electronic devices that use compute virtualization, the set of one or more processor(s) 722 typically execute software to instantiate a virtualization layer 708 and one or more software container(s) 704A-704R (e.g., with operating system-level virtualization, the virtualization layer 708 may represent a container engine (such as Docker Engine by Docker, Inc. or rkt in Container Linux by Red Hat, Inc.) running on top of (or integrated into) an operating system, and it allows for the creation of multiple software containers 704A-704R (representing separate user space instances and also called virtualization engines, virtual private servers, or jails) that may each be used to execute a set of one or more applications; with full virtualization, the virtualization layer 708 represents a hypervisor (sometimes referred to as a virtual machine monitor (VMM)) or a hypervisor executing on top of a host operating system, and the software containers 704A-704R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 728 is executed within the software container 704A on the virtualization layer 708. In electronic devices where compute virtualization is not used, the instance 706 on top of a host operating system is executed on the "bare metal" electronic device 700. The instantiation of the instance 706, as well as the virtualization layer 708 and software containers 704A-704R if implemented, are collectively referred to as software instance(s) 702.

Alternative implementations of an electronic device may have numerous variations from that described above. For example, customized hardware and/or accelerators might also be used in an electronic device.

Environment Example

Figure 7B:
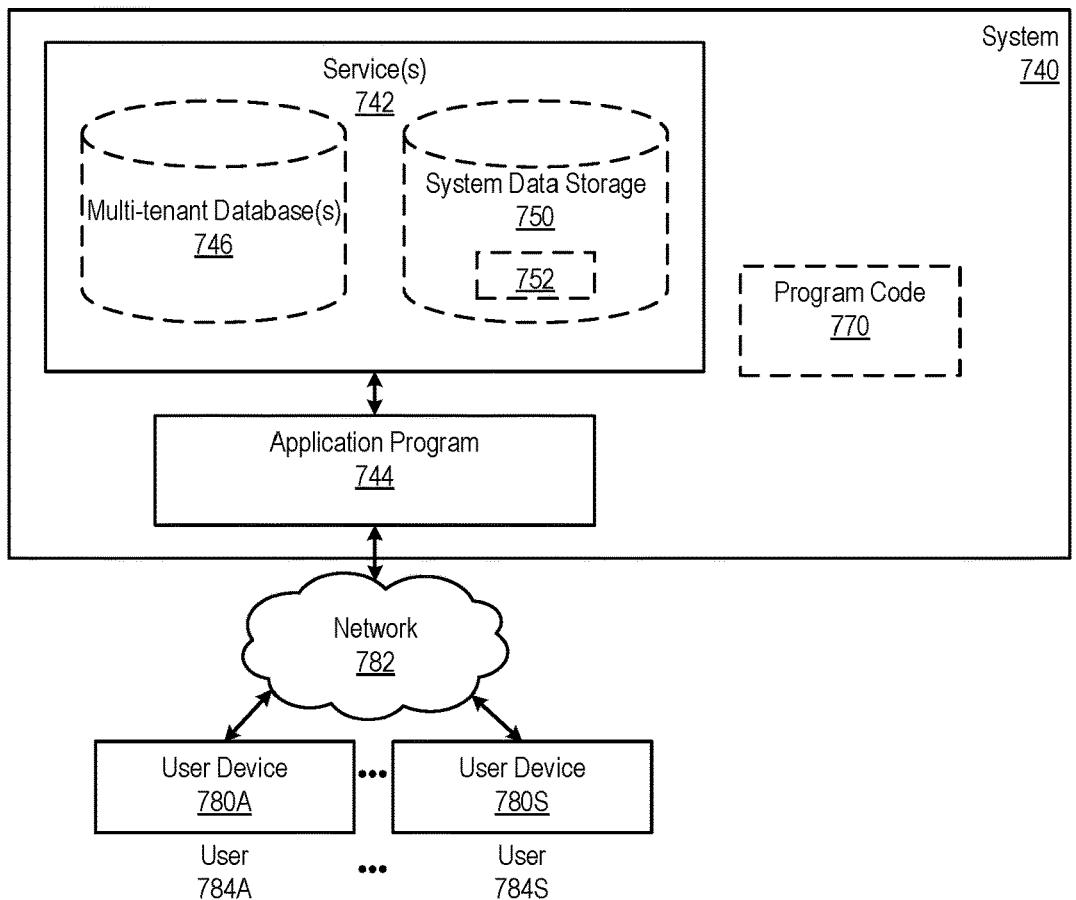
FIG. 7B is a block diagram of a deployment environment in accordance with various implementations.

FIG. 7B is a block diagram of a deployment environment according to some example implementations. A system 740 includes hardware (e.g., a set of one or more server devices) and software to provide service(s) 742, including services associated with the implementations described herein. In some implementations the system 740 is in one or more datacenter(s). These datacenter(s) may be: 1) first party datacenter(s), which are datacenter(s) owned and/or operated by the same entity that provides and/or operates some or all of the software that provides the service(s) 742; and/or 2) third-party datacenter(s), which are datacenter(s) owned and/or operated by one or more different entities than the entity that provides the service(s) 742 (e.g., the different entities may host some or all of the software provided and/or operated by the entity that provides the service(s) 742). For example, third-party datacenters may be owned and/or operated by entities providing public cloud services (e.g., Amazon.com, Inc. (Amazon Web Services), Google LLC (Google Cloud Platform (GCP)), Microsoft Corporation (Azure)).

The system 740 is coupled to user devices 780A-780S over a network 782. The service(s) 742 may be on-demand services that are made available to one or more of the users 784A-784S working for one or more entities other than the entity which owns and/or operates the on-demand services (those users sometimes referred to as outside users) so that those entities need not be concerned with building and/or maintaining a system, but instead may make use of the service(s) 742 when needed (e.g., when needed by the users 784A-784S). The service(s) 742 may communicate with each other and/or with one or more of the user devices 780A-780S via one or more APIs (e.g., a REST API). In some implementations, the user devices 780A-780S are operated by users 784A-784S, and each may be operated as a client device and/or a server device. In some implementations, one or more of the user devices 780A-780S are separate ones of the electronic device 700 or include one or more features of the electronic device 700.

In some implementations, the system 740 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 740 is a multi-tenant cloud computing architecture supporting multiple services, such as one or more of the following types of services: Self-Healing Build Pipeline service 742; Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 740 may include an application platform 744 that enables PAAS for creating, managing, and executing one or more applications developed by the provider of the application platform 744, users accessing the system 740 via one or more of user devices 780A-780S, or third-party application developers accessing the system 740 via one or more of user devices 780A-780S.

In some implementations, one or more of the service(s) 742 may use one or more multi-tenant databases 746, as well as system data storage 750 for system data 752 accessible to system 740. In certain implementations, the system 740 includes a set of one or more servers that are running on server electronic devices and that are configured to handle requests for any authorized user associated with any tenant (there is no server affinity for a user and/or tenant to a specific server). The user devices 780A-780S communicate with the server(s) of system 740 to request and update tenant-level data and system-level data hosted by system 740, and in response the system 740 (e.g., one or more servers in system 740) automatically may generate one or more Structured Query Language (SQL) statements (e.g., one or more SQL queries) that are designed to access the desired information from the multi-tenant database(s) 746 and/or system data storage 750.

In some implementations, the service(s) 742 are implemented using virtual applications dynamically created at run time responsive to queries from the user devices 780A-780S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 760 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 744 includes an application setup mechanism that supports application developers' creation and management of applications, which may be saved as metadata by save routines. Invocations to such applications, including the network protocol for extending a trust boundary between cloud domains of the same entity, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 782 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 740 and the user devices 780A-780S.

Each user device 780A-780S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 740. For example, the user interface device can be used to access data and applications hosted by system 740, and to perform searches on stored data, and otherwise allow one or more of users 784A-784S to interact with various GUI pages that may be presented to the one or more of users 784A-784S. User devices 780A-780S might communicate with system 740 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 780A-780S might include an HTTP client, commonly referred to as a "browser," for sending and receiving HTTP messages to and from server(s) of system 740, thus allowing users 784A-784S of the user devices 780A-780S to access, process and view information, pages and applications available to it from system 740 over network 782.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer system for software service integration, the computer system comprising:
   a processor; and
   memory coupled to the processor and storing instructions that, when executed by the processor, are configurable to cause the computer system to:
   receive, from a computing device of a user, a request for a design operation associated with a connector operable to interface with a software service, wherein the design operation is to: test connectivity, complete a list of system interaction options, determine a set of fields or types associated with a system interaction, or determine an output data sample;
   identify, based on the request for the design operation, whether an operation-specific processor exists for the connector to process the design operation, wherein the operation-specific processor comprises a software instance that is generated based on: a group identifier, an artifact identifier, and a version identifier;
   select the operation-specific processor based on the identifying, the selecting including:
   selecting the identified operation-specific processor in response to determining that the operation-specific processor exists for the connector; and
   generating a new operation-specific processor for the connector in response to determining that no operation-specific processor exists for the connector;
   execute the design operation using the selected operation-specific processor based on the request; and
   send a response to the computing device of the user that includes an indication of a result of executing the design operation.

2. The computer system of claim 1, wherein the request for the design operation includes one or more input parameters to use in executing the design operation.

3. The computer system of claim 2, wherein the execution of the design operation includes sending the one or more input parameters to the operation-specific processor.

4. The computer system of claim 1, wherein identifying the operation-specific processor includes generating the operation-specific processor to execute the design operation for a first time, and caching the operation-specific processor to execute the design operation in response to subsequent requests for the design operation.

5. The computer system of claim 1, wherein the software instance is generated based on dependency information for the connector.

6. The computer system of claim 1, wherein the connector comprises software to connect to a system via an application programming interface (API).

7. The computer system of claim 1, wherein the request for the design operation is a first request, and the memory further stores instructions to cause the computer system to:
receive, from the computing device of the user, a second request for the design operation associated with the connector;
identify, based on the second request for the design operation, the operation-specific processor that executed the design operation in response to the first request;
execute the design operation based on the second request; and
send a response to the computing device of the user that includes an indication of a result of executing the design operation based on the second request.

8. The computer system of claim 7, wherein executing the design operation based on the second request includes retrieving the operation-specific processor from a cache subsequent to execution of the design operation based on the first request, and executing the design operation using the retrieved operation-specific processor.

9. The computer system of claim 7, wherein the operation-specific processor is a first operation-specific processor, and wherein executing the design operation based on the second request includes:
determining that the user associated with the first operation-specific processor has reached a maximum number of concurrent operations; and
generating a second operation-specific processor with which to execute the design operation based on the second request.

10. The computer system of claim 1, wherein the memory further stores instructions to cause the computer system to:
determine that an available pool of pods of computing resources to use in executing the design operation is below a predetermined threshold; and
add a predetermined number of pods to the pool of pods.

11. The computer system of claim 1, wherein the memory further stores instructions to cause the computer system to monitor deployment of the operation-specific processor and manage a lifecycle associated with the operation-specific processor.

12. The computer system of claim 11, wherein monitoring deployment of the operation-specific processor includes determining whether the operation-specific processor is free for assignment, currently in use, or pending deletion.

13. The computer system of claim 11, wherein managing the lifecycle of the operation-specific processor includes initiating a series of warmup steps to prepare the operation-specific processor for executing the design operation.

14. The computer system of claim 13, wherein the warmup steps include one or more of: file system warmup steps, and memory or class-loading warmup steps.

15. The computer system of claim 1, wherein the operation-specific processor is generated using memory isolation or disk isolation.

16. The computer system of claim 1, wherein the memory further stores instructions to cause the computer system to:
track historical usage of the operation-specific processor using a machine learning (ML) model; and
determine, using the ML model, an expected number of operation-specific processors needed to handle future requests for design operations.

17. The computer system of claim 1, wherein executing the design operation using the operation-specific processor includes performing a direct mapping to a software function within the connector to execute the software function.

18. A tangible, non-transitory computer-readable medium for software service integration, the computer-readable medium storing instructions that, when executed by a computer system, are configurable to cause the computer system to:
receive, from a computing device of a user, a request for a design operation associated with a connector operable to interface with a software service, wherein the design operation is to: test connectivity, complete a list of system interaction options, determine a set of fields or types associated with a system interaction, or determine an output data sample;
identify, based on the request for the design operation, whether an operation specific processor exists for the connector to process the design operation, wherein the operation-specific processor comprises a software instance that is generated based on: a group identifier, an artifact identifier, and a version identifier;
select the operation-specific processor based on the identifying, the selecting including:
selecting the identified operation-specific processor in response to determining that the operation-specific processor exists for the connector; and
generating a new operation-specific processor for the connector in response to determining that no operation-specific processor exists for the connector;
execute the design operation using the operation-specific processor based on the request; and
send a response to the computing device of the user that includes an indication of a result of executing the design operation.

19. A method for software service integration, comprising:
receiving, from a computing device of a user, a request for a design operation associated with a connector operable to interface with a software service, wherein the design operation is to:
test connectivity, complete a list of system interaction options, determine a set of fields or types associated with a system interaction, or determine an output data sample;
identifying, based on the request for the design operation, whether an operation-specific processor exists for the connector to process the design operation, wherein the operation-specific processor comprises a software instance that is generated based on: a group identifier, an artifact identifier, and a version identifier;
selecting the operation-specific processor based on the identifying, the selecting including:
selecting the identified operation-specific processor in response to determining that the operation-specific processor exists for the connector; and
generating a new operation-specific processor for the connector in response to determining that no operation-specific processor exists for the connector;
executing the design operation using the selected operation-specific processor based on the request; and sending a response to the computing device of the user that includes an indication of a result of executing the design operation.

\* \* \* \* \*